United States Patent
Jangid et al.

(10) Patent No.: US 12,380,535 B2
(45) Date of Patent: Aug. 5, 2025

(54) SYSTEM AND METHOD FOR SINGLE IMAGE SUPER- RESOLUTION FOR SMART DEVICE CAMERA

(71) Applicant: Samsung Electronics Co., Ltd., Suwon-si (KR)

(72) Inventors: Devendra Kumar Jangid, Goleta, CA (US); Abhiram Gnanasambandam, Frisco, TX (US); John W. Glotzbach, Allen, TX (US); John Seokjun Lee, Allen, TX (US); Hamid R Sheikh, Allen, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 199 days.

(21) Appl. No.: 18/360,536

(22) Filed: Jul. 27, 2023

(65) Prior Publication Data

US 2025/0037237 A1   Jan. 30, 2025

(51) Int. Cl.
  *G06T 3/4053* (2024.01)
  *G06T 3/4046* (2024.01)
  *H04N 23/80* (2023.01)
  *H04N 23/84* (2023.01)

(52) U.S. Cl.
  CPC .......... *G06T 3/4053* (2013.01); *G06T 3/4046* (2013.01); *H04N 23/815* (2023.01); *H04N 23/84* (2023.01)

(58) Field of Classification Search
  CPC ... G06T 3/4053; G06T 3/4046; H04N 23/815; H04N 23/84
  See application file for complete search history.

(56) References Cited

U.S. PATENT DOCUMENTS

| 11,048,974 B2 | 6/2021 | Zhong et al. |
| 11,593,643 B2 | 2/2023 | Martinez-Canales et al. |
| 2013/0135499 A1* | 5/2013 | Song ............. H04N 23/667 348/240.99 |

(Continued)

FOREIGN PATENT DOCUMENTS

| CN | 115082311 A | 9/2022 |
| CN | 115689885 A | 2/2023 |

(Continued)

OTHER PUBLICATIONS

Liang et al., "Details or Artifacts: A Locally Discriminative Learning Approach to Realistic Image Super-Resolution," arXiv:2203.09195v1 [eess.IV], Mar. 2022, 10 pages.

(Continued)

*Primary Examiner* — Mekonnen D Dagnew

(57) ABSTRACT

A method includes extracting multiple shallow features from a low-resolution image using a shallow feature extractor that includes a quaternion convolutional network. The method also includes extracting multiple deep features from the multiple shallow features using a deep feature extractor that includes multiple quaternion residual distillation blocks (QRDBs), where each QRDB includes a quaternion self-attention module. The method further includes reconstructing the multiple deep features into a high-resolution image. Each QRDB may further include a quaternion gated deconvolutional feed forward network (QGDFN) configured to suppress one or more of the multiple deep features.

20 Claims, 11 Drawing Sheets

(56) References Cited

U.S. PATENT DOCUMENTS

2019/0087726 A1* 3/2019 Greenblatt ............... G06N 3/08
2024/0303963 A1* 9/2024 Yang ................... G06V 10/751

FOREIGN PATENT DOCUMENTS

| CN | 111161152 B | 3/2023 |
| CN | 115760573 A | 3/2023 |
| CN | 110942424 B | 4/2023 |
| CN | 112200724 B | 4/2023 |

OTHER PUBLICATIONS

Parcollet et al., "Quaternion Convolutional Neural Networks for Heterogeneous Image Processing," arXiv:1811.02656v1 [cs.CV], Oct. 2018, 5 pages.

Zamir et al., "Restormer: Efficient Transformer for High-Resolution Image Restoration," arXiv:2111.09881v2 [cs.CV], Mar. 2022, 12 pages.

Hui et al., "Lightweight Image Super-Resolution with Information Multi-distillation Network," arXiv:1909.11856v1 [eess.IV], Sep. 2019, 9 pages.

* cited by examiner

SYSTEM AND METHOD FOR SINGLE IMAGE SUPER- RESOLUTION FOR SMART DEVICE CAMERA

TECHNICAL FIELD

This disclosure relates generally to imaging systems and processes. More specifically, this disclosure relates to a system and method for performing single image super-resolution for a smart device camera.

BACKGROUND

Recently, artificial intelligence (AI) technology has been applied to many imaging applications in order to extend the capabilities of non-AI-based image pipelines. For example, AI technology has been applied to applications like super-resolution image generation, denoising, motion deblurring, high dynamic range (HDR) image generation, segmentation, disparity estimation, and the like.

SUMMARY

This disclosure provides a system and method for performing single image super-resolution for a smart device camera.

In a first embodiment, a method includes extracting multiple shallow features from a low-resolution image using a shallow feature extractor that includes a quaternion convolutional network. The method also includes extracting multiple deep features from the multiple shallow features using a deep feature extractor that includes multiple quaternion residual distillation blocks (QRDBs), where each QRDB includes a quaternion self-attention module. The method further includes reconstructing the multiple deep features into a high-resolution image.

In a second embodiment, an electronic device includes at least one processing device configured to extract multiple shallow features from a low-resolution image using a shallow feature extractor that includes a quaternion convolutional network. The at least one processing device is also configured to extract multiple deep features from the multiple shallow features using a deep feature extractor that includes multiple QRDBs, where each QRDB includes a quaternion self-attention module. The at least one processing device is further configured to reconstruct the multiple deep features into a high-resolution image.

In a third embodiment, a non-transitory machine-readable medium contains instructions that when executed cause at least one processor of an electronic device to extract multiple shallow features from a low-resolution image using a shallow feature extractor that includes a quaternion convolutional network. The non-transitory machine-readable medium also contains instructions that when executed cause the at least one processor to extract multiple deep features from the multiple shallow features using a deep feature extractor that includes multiple QRDBs, where each QRDB includes a quaternion self-attention module. The non-transitory machine-readable medium further contains instructions that when executed cause the at least one processor to reconstruct the multiple deep features into a high-resolution image.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The terms "transmit," "receive," and "communicate." as well as derivatives thereof, encompass both direct and indirect communication. The terms "include" and "comprise," as well as derivatives thereof, mean inclusion without limitation. The term "or" is inclusive, meaning and/or. The phrase "associated with" as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

As used here, terms and phrases such as "have," "may have," "include," or "may include" a feature (like a number, function, operation, or component such as a part) indicate the existence of the feature and do not exclude the existence of other features. Also, as used here, the phrases "A or B." "at least one of A and/or B." or "one or more of A and/or B" may include all possible combinations of A and B. For example, "A or B." "at least one of A and B," and "at least one of A or B" may indicate all of (1) including at least one A. (2) including at least one B. or (3) including at least one A and at least one B. Further, as used here, the terms "first" and "second" may modify various components regardless of importance and do not limit the components. These terms are only used to distinguish one component from another. For example, a first user device and a second user device may indicate different user devices from each other, regardless of the order or importance of the devices. A first component may be denoted a second component and vice versa without departing from the scope of this disclosure.

It will be understood that, when an element (such as a first element) is referred to as being (operatively or communicatively) "coupled with/to" or "connected with/to" another element (such as a second element), it can be coupled or connected with/to the other element directly or via a third element. In contrast, it will be understood that, when an element (such as a first element) is referred to as being "directly coupled with/to" or "directly connected with/to" another element (such as a second element), no other element (such as a third element) intervenes between the element and the other element.

As used here, the phrase "configured (or set) to" may be interchangeably used with the phrases "suitable for." "having the capacity to," "designed to" "adapted to" "made to," or "capable of" depending on the circumstances. The phrase "configured (or set) to" does not essentially mean "specifically designed in hardware to." Rather, the phrase "configured to" may mean that a device can perform an operation together with another device or parts. For example, the phrase "processor configured (or set) to perform A. B, and C" may mean a generic-purpose processor (such as a CPU or application processor) that may perform the operations by executing one or more software programs stored in a memory device or a dedicated processor (such as an embedded processor) for performing the operations.

The terms and phrases as used here are provided merely to describe some embodiments of this disclosure but not to limit the scope of other embodiments of this disclosure. It is to be understood that the singular forms "a," "an," and "the" include plural references unless the context clearly dictates otherwise. All terms and phrases, including technical and scientific terms and phrases, used here have the same meanings as commonly understood by one of ordinary skill in the art to which the embodiments of this disclosure belong. It will be further understood that terms and phrases, such as those defined in commonly-used dictionaries, should be interpreted as having a meaning that is consistent with their meaning in the context of the relevant art and will not be interpreted in an idealized or overly formal sense unless expressly so defined here. In some cases, the terms and phrases defined here may be interpreted to exclude embodiments of this disclosure.

Examples of an "electronic device" according to embodiments of this disclosure may include at least one of a smartphone, a tablet personal computer (PC), a mobile phone, a video phone, an e-book reader, a desktop PC, a laptop computer, a netbook computer, a workstation, a personal digital assistant (PDA), a portable multimedia player (PMP), an MP3 player, a mobile medical device, a camera, or a wearable device (such as smart glasses, a head-mounted device (HMD), electronic clothes, an electronic bracelet, an electronic necklace, an electronic accessory, an electronic tattoo, a smart mirror, or a smart watch). Other examples of an electronic device include a smart home appliance. Examples of the smart home appliance may include at least one of a television, a digital video disc (DVD) player, an audio player, a refrigerator, an air conditioner, a cleaner, an oven, a microwave oven, a washer, a drier, an air cleaner, a set-top box, a home automation control panel, a security control panel, a TV box (such as SAMSUNG HOMESYNC, APPLETV, or GOOGLE TV), a smart speaker or speaker with an integrated digital assistant (such as SAMSUNG GALAXY HOME, APPLE HOMEPOD, or AMAZON ECHO), a gaming console (such as an XBOX, PLAYSTATION, or NINTENDO), an electronic dictionary, an electronic key, a camcorder, or an electronic picture frame. Still other examples of an electronic device include at least one of various medical devices (such as diverse portable medical measuring devices (like a blood sugar measuring device, a heartbeat measuring device, or a body temperature measuring device), a magnetic resource angiography (MRA) device, a magnetic resource imaging (MRI) device, a computed tomography (CT) device, an imaging device, or an ultrasonic device), a navigation device, a global positioning system (GPS) receiver, an event data recorder (EDR), a flight data recorder (FDR), an automotive infotainment device, a sailing electronic device (such as a sailing navigation device or a gyro compass), avionics, security devices, vehicular head units, industrial or home robots, automatic teller machines (ATMs), point of sales (POS) devices, or Internet of Things (IoT) devices (such as a bulb, various sensors, electric or gas meter, sprinkler, fire alarm, thermostat, street light, toaster, fitness equipment, hot water tank, heater, or boiler). Other examples of an electronic device include at least one part of a piece of furniture or building/structure, an electronic board, an electronic signature receiving device, a projector, or various measurement devices (such as devices for measuring water, electricity, gas, or electromagnetic waves). Note that, according to various embodiments of this disclosure, an electronic device may be one or a combination of the above-listed devices. According to some embodiments of this disclosure, the electronic device may be a flexible electronic device. The electronic device disclosed here is not limited to the above-listed devices and may include new electronic devices depending on the development of technology.

In the following description, electronic devices are described with reference to the accompanying drawings, according to various embodiments of this disclosure. As used here, the term "user" may denote a human or another device (such as an artificial intelligent electronic device) using the electronic device.

Definitions for other certain words and phrases may be provided throughout this patent document. Those of ordinary skill in the art should understand that in many if not most instances, such definitions apply to prior as well as future uses of such defined words and phrases.

None of the description in this application should be read as implying that any particular element, step, or function is an essential element that must be included in the claim scope. The scope of patented subject matter is defined only by the claims. Moreover, none of the claims is intended to invoke 35 U.S.C. § 112(f) unless the exact words "means for" are followed by a participle. Use of any other term, including without limitation "mechanism," "module," "device," "unit," "component," "element," "member," "apparatus," "machine," "system," "processor," or "controller," within a claim is understood by the Applicant to refer to structures known to those skilled in the relevant art and is not intended to invoke 35 U.S.C. § 112(f).

BRIEF DESCRIPTION OF THE DRAWINGS

For a more complete understanding of this disclosure and its advantages, reference is now made to the following description taken in conjunction with the accompanying drawings, in which like reference numerals represent like parts.

DETAILED DESCRIPTION

FIGS. 1 through 11, discussed below, and the various embodiments of this disclosure are described with reference to the accompanying drawings. However, it should be appreciated that this disclosure is not limited to these embodiments and all changes and/or equivalents or replacements thereto also belong to the scope of this disclosure.

As discussed above, artificial intelligence (AI) technology has been applied to many imaging applications in order to extend the capabilities of non-AI-based image pipelines. For example AI technology has been applied to applications like super-resolution image generation, denoising, motion deblurring, high dynamic range (HDR) image generation, segmentation, disparity estimation, and the like. Single image super-resolution (SISR), which attempts to generate high-resolution images from given low-resolution images, can be a useful or important application for smartphones and other smart devices due to the physical constraints of optical lenses in such devices. However, existing AI frameworks for SISR are generally considered to be less than ideal for smartphone cameras. For instance, there are not many low resolution (LR)-high resolution (HR) paired data available that have generalizable blur and noise for smartphone cameras. Also, current AI frameworks are inefficient, do not exhibit good performance on smartphone camera images, or both.

This disclosure provides various techniques for performing single image super-resolution for a smart device camera. As described in more detail below, the disclosed systems and methods provide an AI framework for generating a high-resolution image from a low-resolution image, such as a low-resolution image captured using a smartphone camera. The disclosed AI framework is based on a quaternion convolutional neural network (CNN) architecture instead of a standard CNN architecture. Also, the disclosed AI framework may be based on a combination of L1 and Local Discriminative Learning (LDL) losses to generate the high-resolution image. The disclosed framework is efficient for smartphone applications and provides very good final image quality. Note that while some of the embodiments discussed below are described in the context of use in consumer electronic devices (such as smartphones), this is merely one example, and it will be understood that the principles of this disclosure may be implemented in any number of other suitable contexts and may use any suitable devices.

Figure 1:
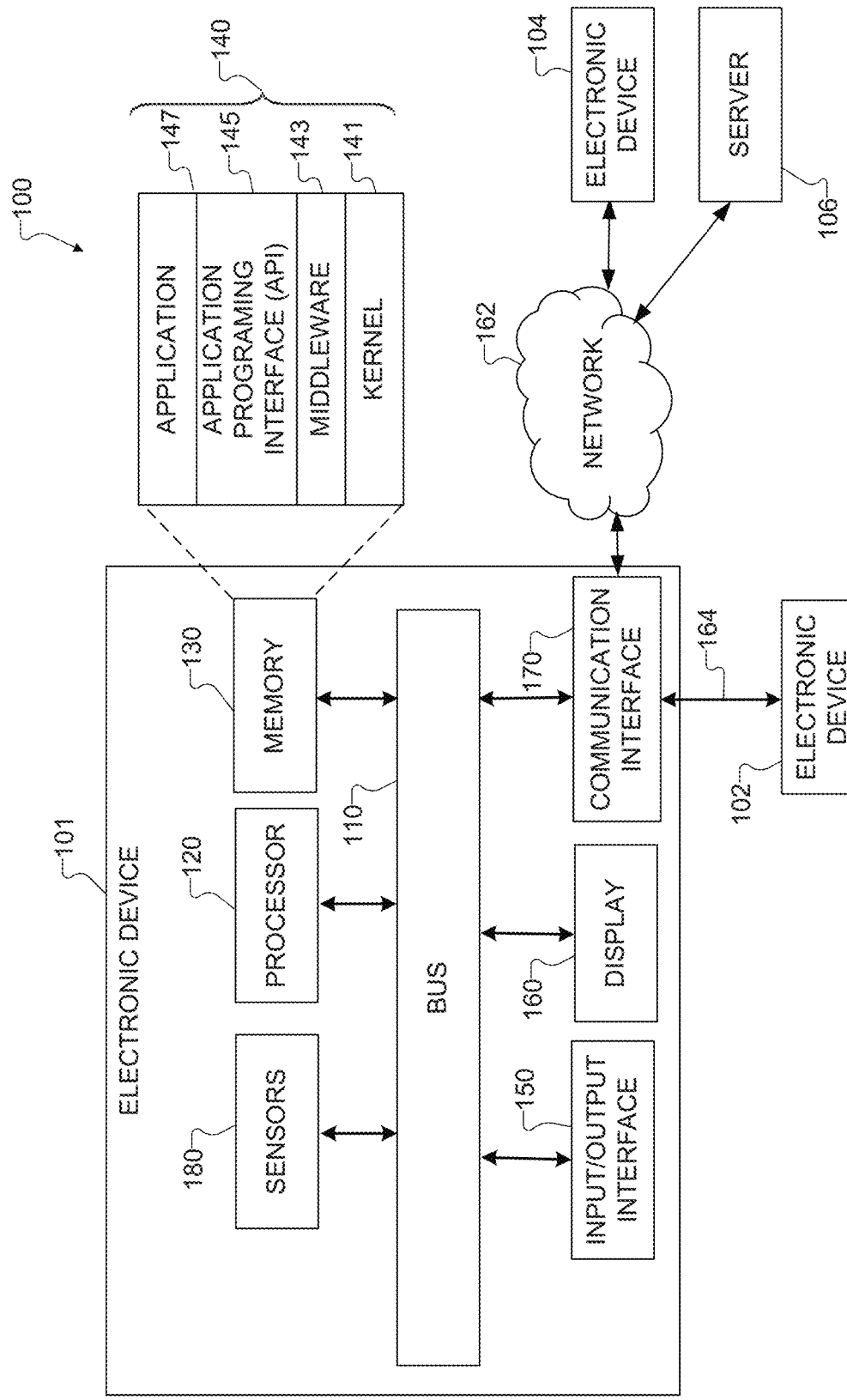
FIG. 1 illustrates an example network configuration including an electronic device according to this disclosure.

FIG. 1 illustrates an example network configuration 100 including an electronic device according to this disclosure. The embodiment of the network configuration 100 shown in FIG. 1 is for illustration only. Other embodiments of the network configuration 100 could be used without departing from the scope of this disclosure.

According to embodiments of this disclosure, an electronic device 101 is included in the network configuration 100. The electronic device 101 can include at least one of a bus 110, a processor 120, a memory 130, an input/output (I/O)) interface 150, a display 160, a communication interface 170, or a sensor 180. In some embodiments, the electronic device 101 may exclude at least one of these components or may add at least one other component. The bus 110 includes a circuit for connecting the components 120-180 with one another and for transferring communications (such as control messages and/or data) between the components.

The processor 120 includes one or more processing devices, such as one or more microprocessors, microcontrollers, digital signal processors (DSPs), application specific integrated circuits (ASICs), or field programmable gate arrays (FPGAs). In some embodiments, the processor 120 includes one or more of a central processing unit (CPU), an application processor (AP), a communication processor (CP), or a graphics processor unit (GPU). The processor 120 is able to perform control on at least one of the other components of the electronic device 101 and/or perform an operation or data processing relating to communication or other functions. As described in more detail below, the processor 120 may perform one or more operations for performing single image super-resolution.

The memory 130 can include a volatile and/or non-volatile memory. For example, the memory 130 can store commands or data related to at least one other component of the electronic device 101. According to embodiments of this disclosure, the memory 130 can store software and/or a program 140. The program 140 includes, for example, a kernel 141, middleware 143, an application programming interface (API) 145, and/or an application program (or "application") 147. At least a portion of the kernel 141, middleware 143, or API 145 may be denoted an operating system (OS).

The kernel 141 can control or manage system resources (such as the bus 110, processor 120, or memory 130) used to perform operations or functions implemented in other programs (such as the middleware 143, API 145, or application 147). The kernel 141 provides an interface that allows the middleware 143, the API 145, or the application 147 to access the individual components of the electronic device 101 to control or manage the system resources. The application 147 may support one or more functions for performing single image super-resolution as discussed below. These functions can be performed by a single application or by multiple applications that each carry out one or more of these functions. The middleware 143 can function as a relay to allow the API 145 or the application 147 to communicate data with the kernel 141, for instance. A plurality of applications 147 can be provided. The middleware 143 is able to control work requests received from the applications 147, such as by allocating the priority of using the system resources of the electronic device 101 (like the bus 110, the processor 120, or the memory 130) to at least one of the plurality of applications 147. The API 145 is an interface allowing the application 147 to control functions provided from the kernel 141 or the middleware 143. For example, the API 145 includes at least one interface or function (such as a command) for filing control, window control, image processing, or text control.

The I/O interface 150 serves as an interface that can, for example, transfer commands or data input from a user or other external devices to other component(s) of the electronic device 101. The I/O interface 150 can also output commands or data received from other component(s) of the electronic device 101 to the user or the other external device.

The display 160 includes, for example, a liquid crystal display (LCD), a light emitting diode (LED) display, an organic light emitting diode (OLED) display, a quantum-dot light emitting diode (QLED) display, a microelectromechanical systems (MEMS) display, or an electronic paper display. The display 160 can also be a depth-aware display, such as a multi-focal display. The display 160 is able to display, for example, various contents (such as text, images, videos, icons, or symbols) to the user. The display 160 can include a touchscreen and may receive, for example, a touch, gesture, proximity, or hovering input using an electronic pen or a body portion of the user.

The communication interface 170, for example, is able to set up communication between the electronic device 101 and an external electronic device (such as a first electronic device 102, a second electronic device 104, or a server 106). For example, the communication interface 170 can be connected with a network 162 or 164 through wireless or wired communication to communicate with the external electronic device. The communication interface 170 can be a wired or wireless transceiver or any other component for transmitting and receiving signals.

The wireless communication is able to use at least one of, for example, WiFi, long term evolution (LTE), long term evolution-advanced (LTE-A), 5th generation wireless system (5G), millimeter-wave or 60 GHz wireless communication, Wireless USB, code division multiple access (CDMA), wideband code division multiple access (WCDMA), universal mobile telecommunication system (UMTS), wireless broadband (WiBro), or global system for mobile communication (GSM), as a communication protocol. The wired connection can include, for example, at least one of a universal serial bus (USB), high definition multimedia interface (HDMI), recommended standard 232 (RS-232), or plain old telephone service (POTS). The network 162 or 164 includes at least one communication network, such as a computer network (like a local area network (LAN) or wide area network (WAN)), Internet, or a telephone network.

The electronic device 101 further includes one or more sensors 180 that can meter a physical quantity or detect an activation state of the electronic device 101 and convert metered or detected information into an electrical signal. For example, one or more sensors 180 can include one or more cameras or other imaging sensors for capturing images of scenes. The sensor(s) 180 can also include one or more buttons for touch input, a gesture sensor, a gyroscope or gyro sensor, an air pressure sensor, a magnetic sensor or magnetometer, an acceleration sensor or accelerometer, a grip sensor, a proximity sensor, a color sensor (such as a red green blue (RGB) sensor), a bio-physical sensor, a temperature sensor, a humidity sensor, an illumination sensor, an ultraviolet (UV) sensor, an electromyography (EMG) sensor, an electroencephalogram (EEG) sensor, an electrocardiogram (ECG) sensor, an infrared (IR) sensor, an ultrasound sensor, an iris sensor, or a fingerprint sensor. The sensor(s) 180 can further include an inertial measurement unit, which can include one or more accelerometers, gyroscopes, and other components. In addition, the sensor(s) 180 can include a control circuit for controlling at least one of the sensors included here. Any of these sensor(s) 180 can be located within the electronic device 101.

In some embodiments, the electronic device 101 can be a wearable device or an electronic device-mountable wearable device (such as an HMD). For example, the electronic device 101 may represent an AR wearable device, such as a headset with a display panel or smart eyeglasses In other embodiments, the first external electronic device 102 or the second external electronic device 104 can be a wearable device or an electronic device-mountable wearable device (such as an HMD). In those other embodiments, when the electronic device 101 is mounted in the electronic device 102 (such as the HMD), the electronic device 101 can communicate with the electronic device 102 through the communication interface 170. The electronic device 101 can be directly connected with the electronic device 102 to communicate with the electronic device 102 without involving a separate network.

The first and second external electronic devices 102 and 104 and the server 106 each can be a device of the same or a different type from the electronic device 101. According to certain embodiments of this disclosure, the server 106 includes a group of one or more servers. Also, according to certain embodiments of this disclosure, all or some of the operations executed on the electronic device 101 can be executed on another or multiple other electronic devices (such as the electronic devices 102 and 104 or server 106). Further, according to certain embodiments of this disclosure, when the electronic device 101 should perform some function or service automatically or at a request, the electronic device 101, instead of executing the function or service on its own or additionally, can request another device (such as electronic devices 102 and 104 or server 106) to perform at least some functions associated therewith. The other electronic device (such as electronic devices 102 and 104 or server 106) is able to execute the requested functions or additional functions and transfer a result of the execution to the electronic device 101. The electronic device 101 can provide a requested function or service by processing the received result as it is or additionally. To that end, a cloud computing, distributed computing, or client-server computing technique may be used, for example. While FIG. 1 shows that the electronic device 101 includes the communication interface 170 to communicate with the external electronic device 104 or server 106 via the network 162 or 164, the electronic device 101 may be independently operated without a separate communication function according to some embodiments of this disclosure.

The server 106 can include the same or similar components 110-180 as the electronic device 101 (or a suitable subset thereof). The server 106 can support to drive the electronic device 101 by performing at least one of operations (or functions) implemented on the electronic device 101. For example, the server 106 can include a processing module or processor that may support the processor 120 implemented in the electronic device 101. As described in more detail below, the server 106 may perform one or more operations to support techniques for performing single image super-resolution.

Although FIG. 1 illustrates one example of a network configuration 100 including an electronic device 101, various changes may be made to FIG. 1. For example, the network configuration 100 could include any number of each component in any suitable arrangement. In general, computing and communication systems come in a wide variety of configurations, and FIG. 1 does not limit the scope of this disclosure to any particular configuration. Also, while FIG. 1 illustrates one operational environment in which various features disclosed in this patent document can be used, these features could be used in any other suitable system.

Figure 2:
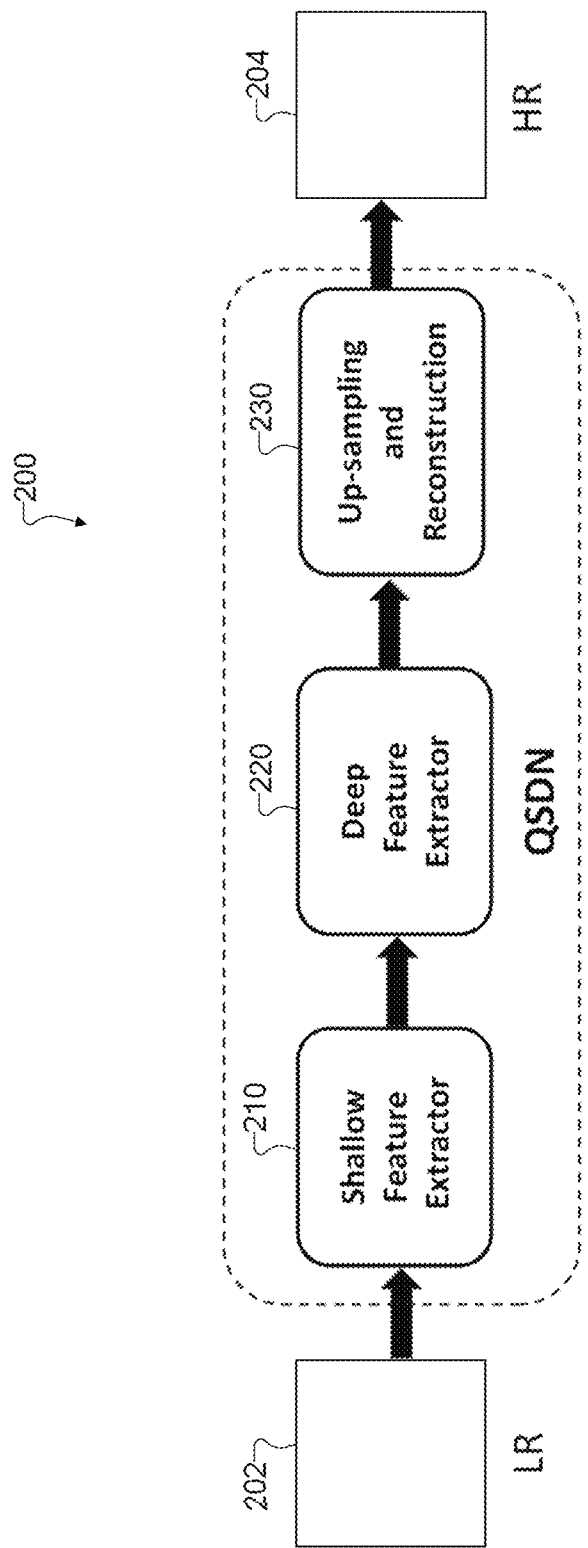
FIG. 2 illustrates an example system for performing single image super-resolution for a smart device camera according to this disclosure.

FIG. 2 illustrates an example system 200 for performing single image super-resolution for a smart device camera according to this disclosure. For ease of explanation, the system 200 is described as being implemented using one or more components of the network configuration 100 of FIG. 1 described above, such as the electronic device 101. However, this is merely one example, and the system 200 could be implemented using any other suitable device(s) (such as the server 106) and in any other suitable system(s).

As described in greater detail below, the system 200 uses multiple quaternion CNN operations instead of standard CNN operations. Conventional CNNs handle each of the red, green, and blue channels of an RGB image independently. More specifically, each channel is processed using two-dimensional convolution kernels, which generate scalar feature maps. In contrast, quaternion CNNs efficiently represent and analyze all color channels as single entity. Quaternion kernels are three-dimensional and feature a unique linear combination of each axis, which can help extract texture information across channels. As a result, the number of trainable parameters is substantially reduced compared to conventional CNNs. In some cases, for instance, the number of trainable parameters can be reduced by a factor of four.

As shown in FIG. 2, the system 200 can be referred to as a Quaternion Super-Resolution Distillation Network (QSDN) and includes multiple sub-networks, such as a shallow feature extractor 210, a deep feature extractor 220, and an up-sampling and reconstruction network 230. The electronic device 101 receives a low-resolution (LR) image 202 and uses the system 200 to process the low-resolution image 202 into a high-resolution (HR) image 204. Here, "low resolution" and "high resolution" are relative to each other such that the high-resolution image 204 includes more pixels than the low-resolution image 202. For example, the low-resolution image 202 can be a three-megapixel image, and the high-resolution image 204 can be a twelve-megapixel image. Of course, these values are merely examples, and higher or lower image resolutions are possible for each of the low-resolution image 202 and the high-resolution image 204.

In some cases, the low-resolution image 202 may represent an image captured or generated by the electronic device 101 using one or more imaging sensors 180. Here, the electronic device 101 can represent a smart device, such as a smartphone, a tablet, or the like, and the imaging sensor(s) 180 can represent one or more cameras of the electronic device 101. In some embodiments, the electronic device 101 captures multiple raw image frames for a scene using the imaging sensor(s) 180. The raw image frames are processed using a multi-frame processing (MFP) function to generate a single red, green, blue (RGB) image, which is the low-resolution image 202. As a particular example, a multi-frame processing function may implement one or more of the processes described in U.S. Pat. No. 10,805,649 (which is hereby incorporated by reference in its entirety). Note, however, that multi-frame processing may occur in any other suitable manner.

The electronic device 101 provides the low-resolution image 202 as an input to the shallow feature extractor 210. The shallow feature extractor 210 processes the low-resolution image 202 to generate multiple shallow features that represent the low-resolution image 202. Here, the term "shallow" refers to the fact that there is only one or several convolutional layers used in the shallow feature extractor 210, and thus the data transformation in the shallow feature extractor 210 is relatively shallow. This is in contrast to the deep feature extractor 220, which (as described in greater detail below) includes two or more convolutional layers that are used to generate a relatively "deeper" data transformation than that of the shallow feature extractor 210.

Figure 3:
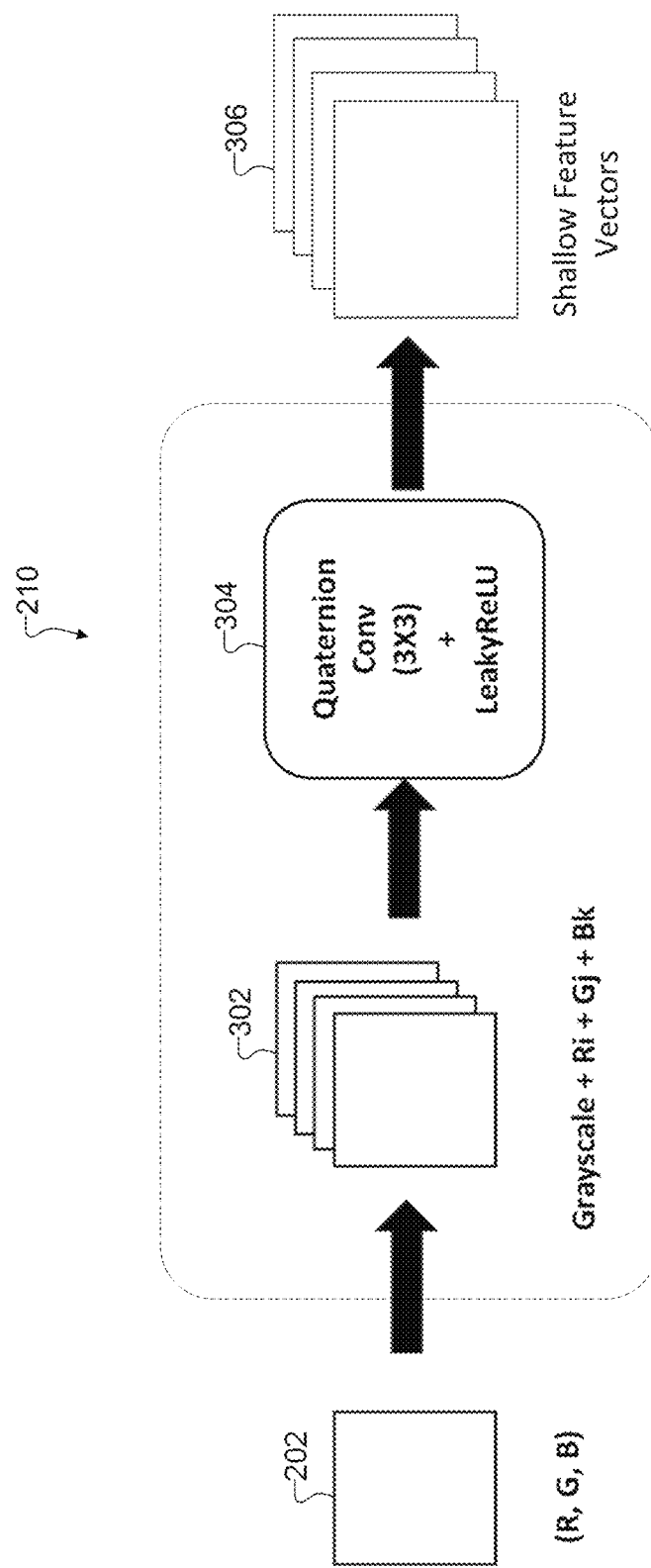
FIG. 3 illustrates an example shallow feature extractor used in the system of FIG. 2 according to this disclosure.

FIG. 3 illustrates an example shallow feature extractor 210 used in the system 200 of FIG. 2 according to this disclosure. As shown in FIG. 3, the shallow feature extractor 210 extracts multiple channels 302 from the low-resolution image 202. In this example, the multiple channels 302 include red, green, blue, and grayscale channels. The shallow feature extractor 210 can perform any suitable channel extraction process to generate the channels 302. Once the channel extraction process is complete, each pixel of the low-resolution image 202 can be represented by a quaternion Q expressed as:

$$Q = \text{Grayscale} + Ri + Gj + Bk$$

Here, R, G, and B represent values in the red, green, and blue channels 302, respectively, and i, j, and k represent quaternion weights for the red, green, and blue channels 302, respectively.

The multiple channels 302 are processed using a quaternion convolutional network 304 to generate multiple shallow feature vectors 306, which represent the multiple shallow features. The quaternion convolutional network 304 can represent any suitable CNN that is implemented using quaternion principles. In some embodiments, for example, the quaternion convolutional network 304 can be a 3×3 convolutional network that includes three-dimensional quaternion kernels. The quaternion convolutional network 304 can also include a leaky rectified linear unit (ReLU) with an activation function. The leaky ReLU is provided as a non-linear activation function for transforming the weighted inputs of the channels 302. In general, when data including the channels 302 has significant noise or outliers, the leaky ReLU can perform better than a regular ReLU since the leaky ReLU provides a non-zero output for negative input values. This can help to avoid discarding potentially important information in the multiple channels 302.

Once the multiple shallow feature vectors 306 are generated, the electronic device 101 provides the multiple shallow feature vectors 306 as input to the deep feature extractor 220. The deep feature extractor 220 includes an efficient information distillation network architecture that processes the shallow feature vectors 306 to extract multiple deep features that represent low-level details of the low-resolution image 202. As discussed above, the deep feature extractor 220 includes more (and possibly significantly more) convolutional layers and thus results in deeper data transformations than the shallow feature extractor 210.

Figure 4:
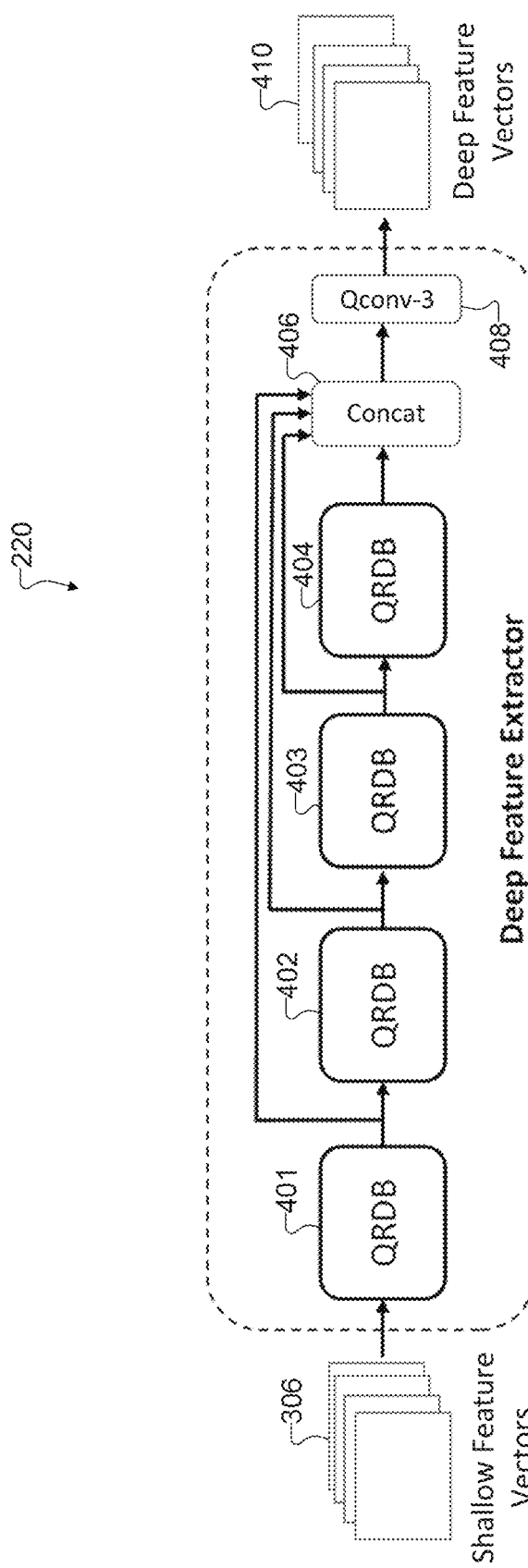
FIG. 4 illustrates an example deep feature extractor used in the system of FIG. 2 according to this disclosure.

FIG. 4 illustrates an example deep feature extractor 220 used in the system 200 of FIG. 2 according to this disclosure. The deep feature extractor 220 performs operations using the shallow feature vectors 306 to generate deep feature vectors 410, which are more detailed than the shallow feature vectors 306. As shown in FIG. 4, the deep feature extractor 220 includes multiple quaternion residual distillation blocks (QRDBs) 401-404, which are followed by a concatenation function 406 and a quaternion convolutional network 408. The QRDBs 401-404 are arranged in series such that an output of a previous QRDB 401-403 is an input of a next QRDB 402-404. While FIG. 4 shows the deep feature extractor 220 as including four QRDBs 401-404, this is merely an example, and other embodiments could include more or fewer QRDBs.

Figure 5:
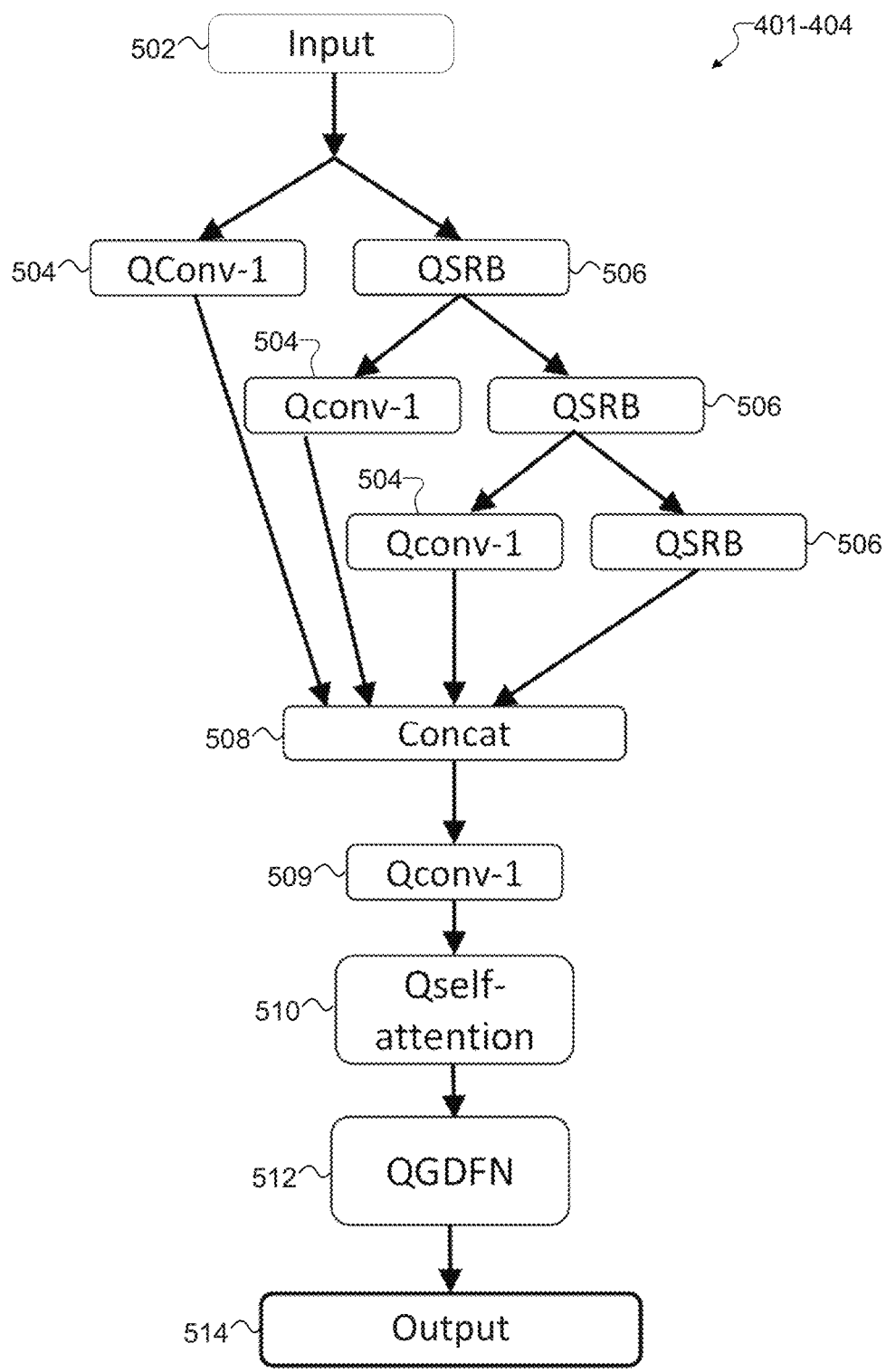
FIG. 5 illustrates an example quaternion residual distillation block (QRDB) used in the system of FIG. 2 according to this disclosure.

FIG. 5 illustrates an example QRDBs 401-404 used in the system 200 of FIG. 2 according to this disclosure. As shown in FIG. 5, each of the QRDBs 401-404 receives an input 502 from a previous operation. Depending on which QRDB 401-404 is being referenced, the input 502 can include the shallow feature vectors 306 or an output of a previous QRDB 401-403. Each QRDB 401-404 processes the input 502 to generate an output 514. Again, depending on which QRDB 401-404 is being referenced, the output 514 can include the input to the concatenation function 406, the input 502 to the next QRDB 402-404, or a combination of these.

Each QRDB 401-404 is configured to generate finer, more-detailed features from the input 502. Since the QRDBs 401-404 are arranged in series, the generated features continue to become more and more detailed with each QRDB 401-404. The processes performed by each QRDB 401-404 are executed by various components of each QRDB 401-404, such as multiple quaternion convolutional networks 504, multiple quaternion shallow residual blocks (QSRBs) 506, a concatenation function 508, a quaternion self-attention block 510, and a quaternion gated deconvolutional feed forward network (QGDFN) 512.

Each of the quaternion convolutional networks 504 may be the same as or similar to the quaternion convolutional network 304 described above. Each quaternion convolutional network 504 is configured to generate multiple features from the input to that quaternion convolutional network 504. In each QRDB 401-404, one or more of the quaternion convolutional networks 304 may have a 1×1 kernel size as indicated by the "Qconv-1" label. Other quaternion convolutional networks 304 could include other kernel sizes, such as 3×3, 5×5, and the like.

The QSRBs 506 may be configured to operate in parallel with some of the quaternion convolutional networks 504 as shown in FIG. 5. Each QSRB 506 is used for residual learning and to extract local features from the input to that QSRB 506. Each QSRB 506 uses any suitable technique(s) or function(s) for performing residual learning and local feature extraction. As shown in FIGURE S, some of the QSRBs 506 and quaternion convolutional networks 504 are arranged in a tree structure, where earlier levels generate inputs to subsequent levels. At the bottom of the tree structure is the concatenation function 508, which combines the outputs of the previous QSRBs 506 and quaternion convolutional networks 504 for input to another quaternion convolutional network 509.

Figure 6:
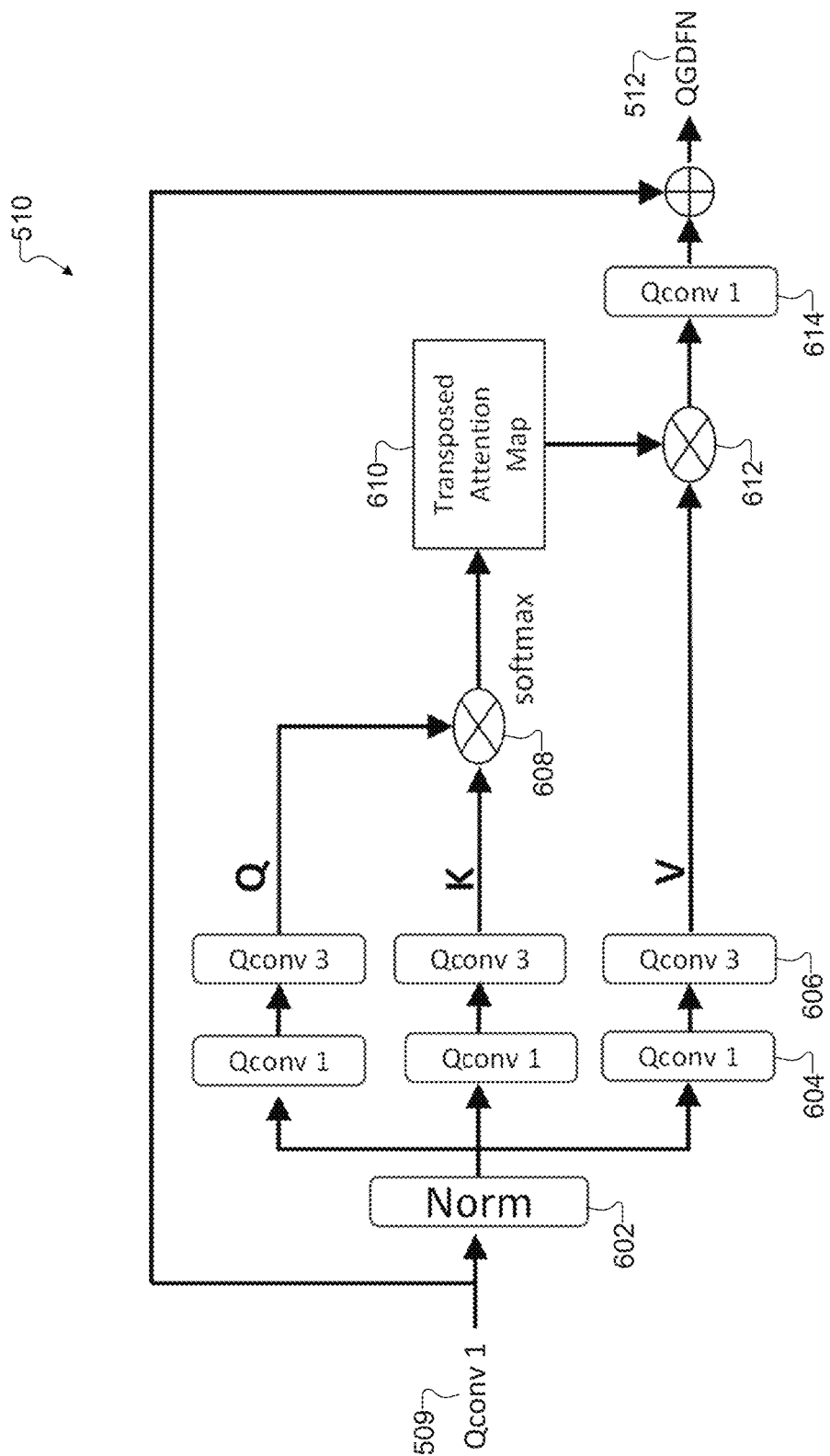
FIG. 6 illustrates an example quaternion self-attention block used in the system of FIG. 2 according to this disclosure.

The quaternion self-attention block 510 uses self-attention to capture long-range spatial relationships and global-level contextual details of the low-resolution image 202. In some embodiments, the quaternion self-attention block 510 is an efficient quaternion self-attention module. FIG. 6 illustrates an example quaternion self-attention block 510 used in the system 200 of FIG. 2 according to this disclosure. As shown in FIG. 6, the quaternion self-attention block 510 includes a normalization block 602, multiple quaternion convolutional networks 604 and 606, multiple softmax operations 608 and 612, a transposed attention map 610, and another quaternion convolutional network 614.

The normalization block 602 normalizes the output from the quaternion convolutional network 509 (such as by using layer normalization) and determines queries (Q), keys (K), and values (V) for the normalized data in parallel. The queries, keys, and values can be used to determine attention weights for the data. The queries, keys, and values are respectively provided as inputs to a first group of quaternion convolutional networks 604 and a second group of quaternion convolutional networks 606. The quaternion convolutional networks 604 and 606 are implemented to generate more-detailed features for the quaternion self-attention block 510. Each of the quaternion convolutional networks 604 and 606 may be the same as or similar to one or more of the quaternion convolutional networks described above, such as the quaternion convolutional network 304 or the quaternion convolutional networks 504. As shown in FIG. 6, the quaternion convolutional networks 604 may have 1×1 kernels, and the quaternion convolutional networks 606 may have 3×3 kernels (as indicated by the "Qconv-3" label). However, other embodiments having kernels of other sizes are possible and within the scope of this disclosure.

Outputs from the quaternion convolutional networks 606 for the queries and keys are combined using a softmax operation 608 to generate a transposed attention map 610. Outputs from the quaternion convolutional network 606 for the values are combined with the transposed attention map 610 using another softmax operation 612, and the result is input to another quaternion convolutional network 614. The quaternion convolutional network 614 may be the same as or similar to one or more of the quaternion convolutional networks described above, such as the quaternion convolutional networks 604 or the quaternion convolutional networks 606. The output of the quaternion convolutional network 614 is combined with the output of the quaternion convolutional network 509, and the combined output here is provided as input to the QGDEN 512.

Figure 7:
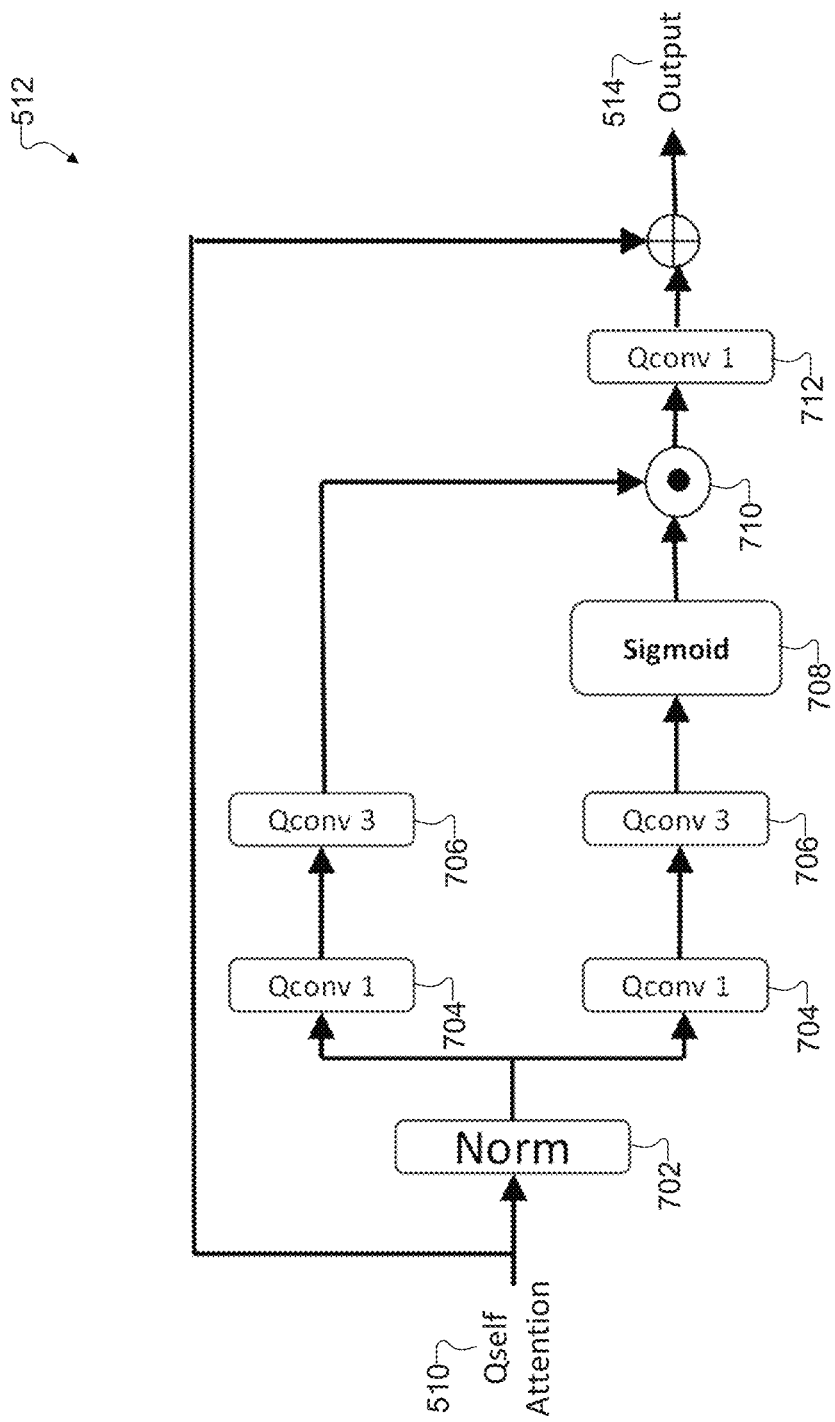
FIG. 7 illustrates an example quaternion gated deconvolutional feed forward network (QGDFN) used in the system of FIG. 2 according to this disclosure.

The QGDFN 512 is used to enable suppression of less informative features such that only useful information is passed further along the pipeline. FIG. 7 illustrates an example QGDFN 512 used in the system 200 of FIG. 2 according to this disclosure. As shown in FIG. 7, the QGDEN 512 includes a normalization block 702, multiple quaternion convolutional networks 704 and 706, a sigmoid function 708, a combiner function 710, and another quaternion convolutional network 712. The normalization block 702 and the quaternion convolutional networks 704 and 706 may be the same as or similar to the normalization block 602 and the quaternion convolutional networks 604 and 606 of the quaternion self-attention block 510 described above. The sigmoid function 708 can be a standard function that is used as an activation layer to normalize data after the quaternion convolutional network 706. In some embodiments, the sigmoid function 708 is used to convert each data value to either −1 or +1 depending on the sign of the data value. The quaternion convolutional network 712 may be the same as or similar to the quaternion convolutional network 614. The output of the quaternion convolutional network 712 is combined with the output of the QGDFN 512 to generate the output 514 of a particular QRDB 401-404.

Returning to FIG. 4, the outputs 514 of the QRDBs 401-404 are combined using the concatenation function 406. That is, the concatenation function 406 combines the relatively-coarser features of the QRDB 401, the relatively-finer features of the QRDB 404, and the "medium" detailed features of the other QRDBs 402 and 403. The concatenation function 406 can perform any suitable combination operation(s) for combining features having different levels of detail.

Once the concatenation function 406 combines the outputs 514 of the QRDBs 401-404, the electronic device 101 provides the combination as input to the quaternion convolutional network 408. The quaternion convolutional network 408 may be the same as or similar to one or more of the quaternion convolutional networks described above, such as the quaternion convolutional network 304 or the quaternion convolutional networks 504. In some embodiments, the quaternion convolutional network 408 has a 3×3 kernel size. The output of the quaternion convolutional network 408 is the set of deep feature vectors 410.

Returning to FIG. 2, after the electronic device 101 uses the deep feature extractor 220 to generate the deep feature vectors 410, the electronic device 101 provides the deep feature vectors 410 as input to the up-sampling and reconstruction network 230. The electronic device 101 implements the up-sampling and reconstruction network 230 to upsample extracted deep features represented by the deep feature vectors 410 and convert back to the four-channel high-resolution image 204.

Figure 8:
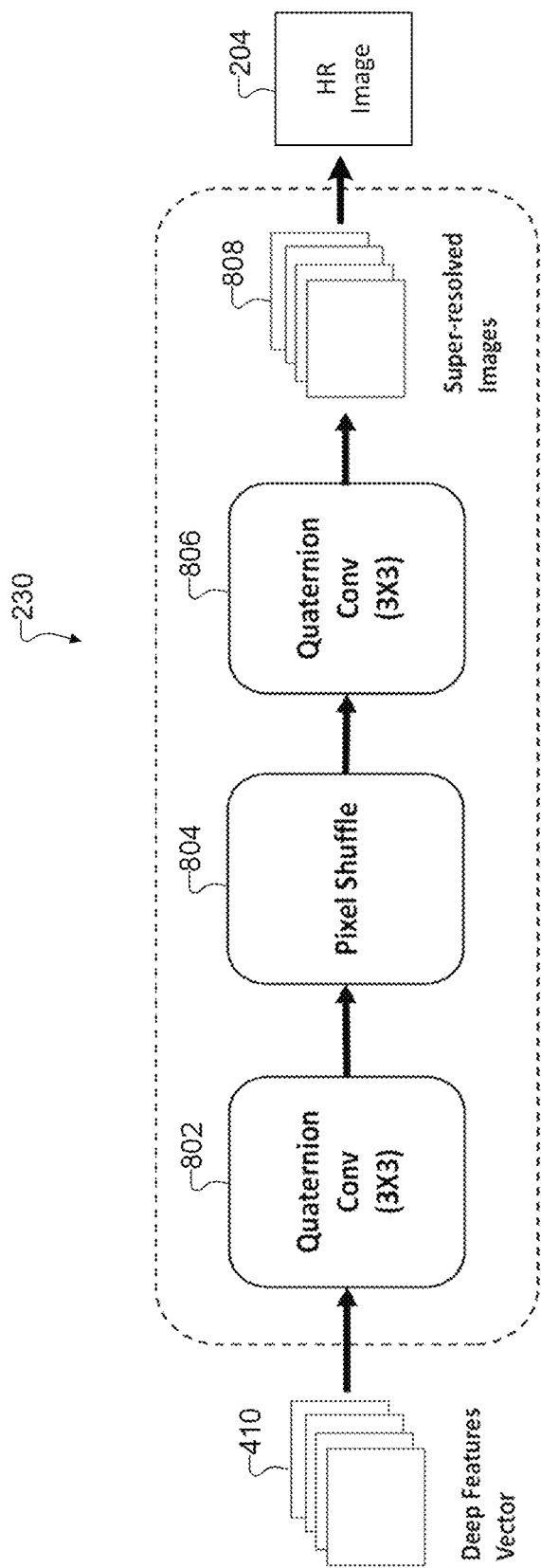
FIG. 8 illustrates an example up-sampling and reconstruction network used in the system of FIG. 2 according to this disclosure.

FIG. 8 illustrates an example up-sampling and reconstruction network 230 used in the system 200 of FIG. 2 according to this disclosure. As shown in FIG. 8, the up-sampling and reconstruction network 230 includes multiple quaternion convolutional networks 802 and 806 separated by a pixel shuffle layer 804. Each of the quaternion convolutional networks 802 and 806 may be the same as or similar to one or more of the quaternion convolutional networks described above, such as the quaternion convolutional network 304 or the quaternion convolutional networks 504. The pixel shuffle layer 804 is provided to shuffle pixels after the quaternion convolutional network 802 and before the quaternion convolutional network 806. The pixel shuffle layer 804 can perform any suitable function(s) or technique(s) for pixel shuffling. The output of the quaternion convolutional network 806 includes four channels 808 (grayscale, red, green, and blue) of a super-resolved image. These channels 808 are combined to generate the final high-resolution image 204.

Although FIGS. 2 through 8 illustrate one example of a system 200 for performing single image super-resolution for a smart device camera and related details, various changes may be made to FIGS. 2 through 8. For example, while the shallow feature extractor 210, the deep feature extractor 220, and the up-sampling and reconstruction network 230 are described as involving specific sequences of operations, various operations described with respect to FIGS. 2 through 8 could overlap, occur in parallel, occur in a different order, or occur any number of times (including zero times). Also, the specific operations shown in FIGS. 2 through 8 are examples only, and other techniques could be used to perform each of the operations shown in FIGS. 2 through 8.

Figure 9:
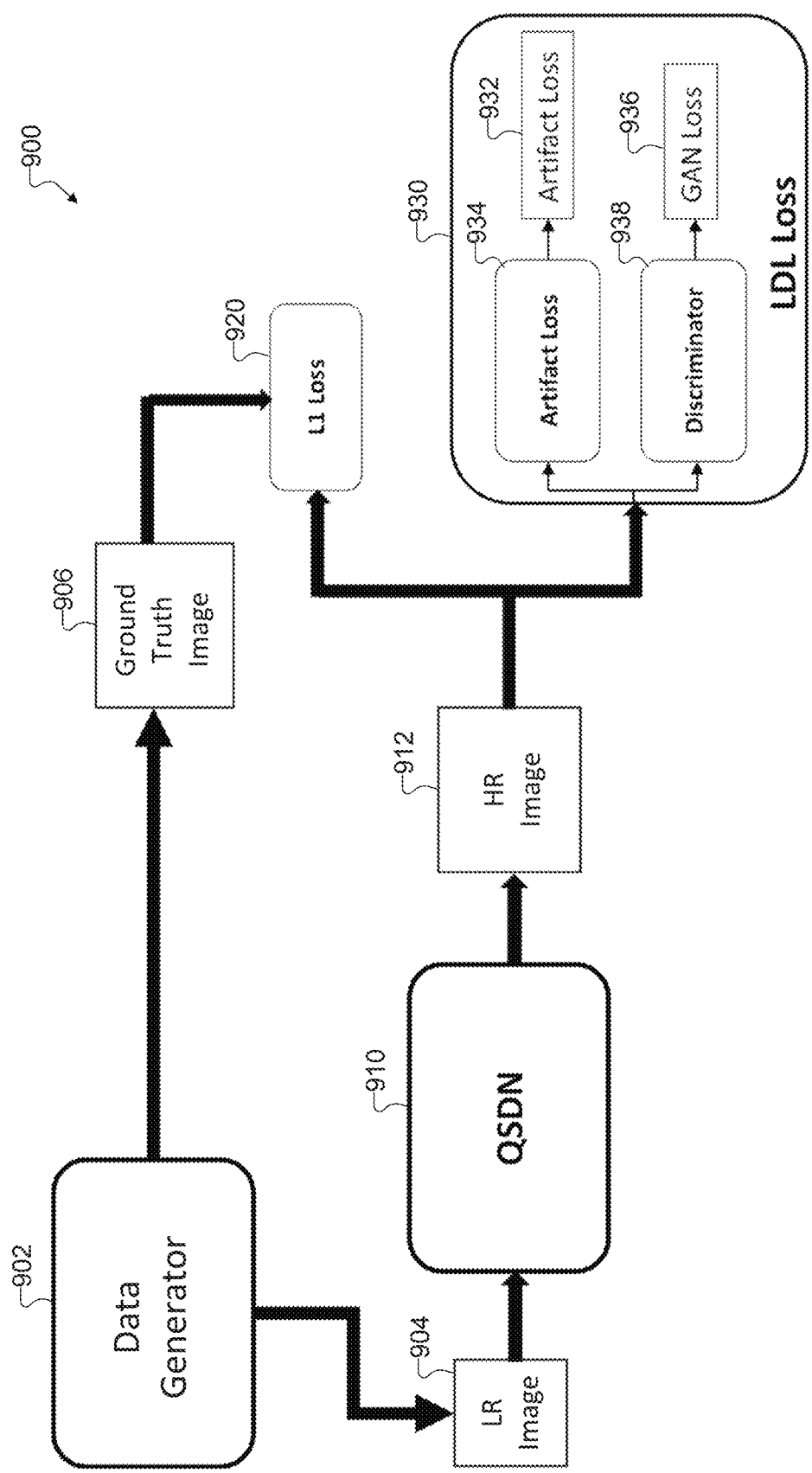
FIG. 9 illustrates an example training framework for training a system that performs single image super-resolution according to this disclosure.

FIG. 9 illustrates an example training framework 900 for training a system that performs single image super-resolution according to this disclosure. For ease of explanation, the framework 900 is described as being implemented using one or more components of the network configuration 100 of FIG. 1 described above, such as the electronic device 101. However, this is merely one example, and the framework 900 could be implemented using any other suitable device(s) (such as the server 106) and in any other suitable system(s).

As shown in FIG. 9, the framework 900 is implemented by the electronic device 101 to train a QSDN 910, which can represent (or be represented by) the system 200 of FIG. 2. The framework 900 uses training data obtained, for example, using a data generator 902. In some embodiments, the training data includes a dataset generated for a particular smartphone or other particular device. Here, the training data includes a low-resolution image 904 and a ground truth image 906. The ground truth image 906 is a high-resolution (super-resolution) image that represents an idealized version of the low-resolution image 904. The data generator 902 can represent any suitable data simulator for generating data to be used for training, or the data generator 902 can include or represent a database of existing RGB training images or other training images. In some embodiments, when the data from an MFP simulator is twelve-bit to sixteen-bit data, the data generator 902 can use gamma correction on both the low-resolution image 904 and the ground truth image 906 before training occurs.

During the training, the QSDN 910 obtains the low-resolution image 904 and generates a high-resolution image 912, which is a super-resolution image (such as the high-resolution image 204). Using the training framework 900, the electronic device 101 trains the QSDN 910 with a combination of an L1 loss 920 and a Local Discriminative Learning (LDL) loss 930. The L1 loss 930 is a standard loss used for image reconstruction training. The LDL loss 930 is a combination of an artifact loss 932 (which can be generated using an artifact loss generator 934) and a generative adversarial network (GAN) loss 936 (which can be generated using a discriminator network 938). Here, the artifact loss 932 refers to a loss function that is used to isolate or reduce artifacts in image data. The GAN loss 936 refers to a loss function that reflects the distance between a distribution of data generated by a GAN or other discriminator and a distribution of real data. The LDL loss 930 can be used to reduce artifacts and generate realistic-looking features and textures.

Although FIG. 9 illustrates one example of a training framework 900 for training a system that performs single image super-resolution, various changes may be made to FIG. 9. For example, while the training framework 900 is described as involving specific sequences of operations, various operations described with respect to FIG. 9 could overlap, occur in parallel, occur in a different order, or occur any number of times (including zero times). Also, while the training framework 900 is described above as being performed by the electronic device 101, all or portions of the training framework 900 can be implemented by another device (such as the server 106).

Note that the operations and functions shown in or described with respect to FIGS. 2 through 9 can be implemented in an electronic device 101, 102, 104, server 106, or other device(s) in any suitable manner. For example, in some embodiments, the operations and functions shown in or described with respect to FIGS. 2 through 9 can be implemented or supported using one or more software applications or other software instructions that are executed by the processor 120 of the electronic device 101, 102, 104, server 106, or other device(s). In other embodiments, at least some of the operations and functions shown in or described with respect to FIGS. 2 through 9 can be implemented or supported using dedicated hardware components. In general, the operations and functions shown in or described with respect to FIGS. 2 through 9 can be performed using any suitable hardware or any suitable combination of hardware and software/firmware instructions. Also, the functions shown in or described with respect to FIGS. 2 through 9 can be performed by a single device or by multiple devices.

Figure 10A:
FIGS. 10A and 10B illustrate examples of benefits that can be realized using one or more embodiments of this disclosure.
Figure 10B:

FIGS. 10A and 10B illustrate examples of benefits that can be realized using one or more embodiments of this disclosure. In FIG. 10A, a low-resolution image 1001 of a scene is shown that has been generated using a conventional smartphone camera. As shown in FIG. 10A, the low-resolution image 1001 includes significant blurring in the foreground. In FIG. 10B, a high-resolution image 1002 of the same scene has been generated using a single image super-resolution process as disclosed above (such as is described in FIGS. 2 through 8). The single image super-resolution process increases the number of pixels that represent the scene. As evident by FIG. 10B, the high-resolution image 1002 exhibits superior image quality compared to the low-resolution image 1001. In particular, the high-resolution image 1002 is much sharper and more realistic than the low-resolution image 1001, especially in the foreground regions.

Although FIGS. 10A and 10B illustrate examples of benefits that can be realized using one or more embodiments of this disclosure, various changes may be made to FIGS. 10A and 10B. For example, images can be captured of numerous scenes under different lighting conditions and from different distances and angles, and these figures do not limit the scope of this disclosure. These figures are merely meant to illustrate one example of the types of benefits that might be obtainable using the techniques described above.

Figure 11:
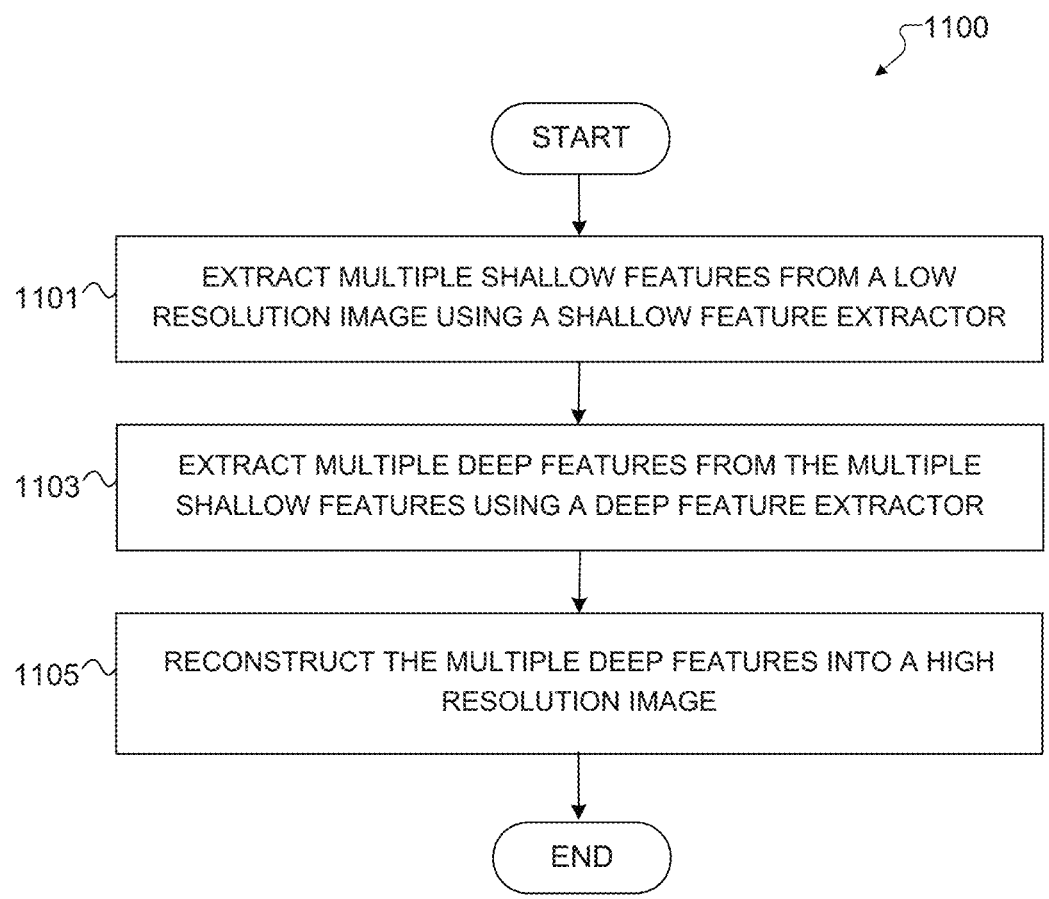
FIG. 11 illustrates an example method for performing single image super-resolution for a smart device camera according to this disclosure.

FIG. 11 illustrates an example method 1100 for performing single image super-resolution for a smart device camera according to this disclosure. For ease of explanation, the method 1100 shown in FIG. 11 is described as being performed using the electronic device 101 shown in FIG. 1 using the system 200 shown in FIG. 2. However, the method 1100 shown in FIG. 11 could be used with any other suitable device(s) or system(s).

As shown in FIG. 11, at step 1101, multiple shallow features are extracted from a low-resolution image using a shallow feature extractor that includes a quaternion convolutional network. This could include, for example, the electronic device 101 extracting the multiple shallow feature vectors 306 from the low-resolution image 202 using the shallow feature extractor 210, such as described in FIGS. 2 and 3. At step 1103, multiple deep features are extracted from the multiple shallow features using a deep feature extractor that includes multiple QRDBs, where each QRDB may include a quaternion self-attention module. This could include, for example, the electronic device 101 extracting the deep feature vectors 410 from the shallow feature vectors 306 using the deep feature extractor 220, such as described in FIGS. 2 and 4 through 7. At step 1105, the multiple deep features are reconstructed into a high-resolution image. This could include, for example, the electronic device 101 reconstructing the deep feature vectors 410 into the high-resolution image 204 using the up-sampling and reconstruction network 230, such as described in FIGS. 2 and 8.

Although FIG. 11 illustrates one example of a method 1100 for performing single image super-resolution for a smart device camera, various changes may be made to FIG. 11. For example, while shown as a series of steps, various steps in FIG. 11 could overlap, occur in parallel, occur in a different order, or occur any number of times (including zero times).

Although this disclosure has been described with reference to various example embodiments, various changes and modifications may be suggested to one skilled in the art. It is intended that this disclosure encompass such changes and modifications as fall within the scope of the appended claims.

What is claimed is:

1. A method comprising:
   extracting multiple shallow features from a low-resolution image using a shallow feature extractor that includes a quaternion convolutional network;
   extracting multiple deep features from the multiple shallow features using a deep feature extractor that includes multiple quaternion residual distillation blocks (QRDBs), each QRDB comprising a quaternion self-attention module; and
   reconstructing the multiple deep features into a high-resolution image.

2. The method of claim 1, wherein the low-resolution image comprises a red-green-blue (RGB) image captured using a camera of a smartphone.

3. The method of claim 1, wherein extracting the multiple shallow features from the low-resolution image comprises:
   extracting red, green, blue, and grayscale channels from the low-resolution image; and
   processing the red, green, blue, and grayscale channels using the quaternion convolutional network to generate multiple feature vectors representing the multiple shallow features.

4. The method of claim 1, wherein the quaternion convolutional network comprises a leaky rectified linear unit (ReLU).

5. The method of claim 1, wherein the QRDBs are arranged in series such that an output of a previous QRDB is an input of a next QRDB.

6. The method of claim 1, wherein each QRDB further comprises a quaternion gated deconvolutional feed forward network (QGDFN) configured to suppress one or more of the multiple deep features.

7. The method of claim 1, wherein reconstructing the multiple deep features into the high-resolution image comprises:
   processing the multiple deep features using a second quaternion convolutional network;
   performing a pixel shuffle on an output of the second quaternion convolutional network; and
   processing an output of the pixel shuffle using a third quaternion convolutional network to generate the high-resolution image.

8. An electronic device comprising:
   at least one processing device configured to:
      extract multiple shallow features from a low-resolution image using a shallow feature extractor that includes a quaternion convolutional network;
      extract multiple deep features from the multiple shallow features using a deep feature extractor that includes multiple quaternion residual distillation blocks (QRDBs), each QRDB comprising a quaternion self-attention module; and
      reconstruct the multiple deep features into a high-resolution image.

9. The electronic device of claim 8, wherein the low-resolution image comprises a red-green-blue (RGB) image captured using a camera of a smartphone.

10. The electronic device of claim 8, wherein, to extract the multiple shallow features from the low-resolution image, the at least one processing device is configured to:
    extract red, green, blue, and grayscale channels from the low-resolution image; and
    process the red, green, blue, and grayscale channels using the quaternion convolutional network to generate multiple feature vectors representing the multiple shallow features.

11. The electronic device of claim 8, wherein the quaternion convolutional network comprises a leaky rectified linear unit (ReLU).

12. The electronic device of claim 8, wherein the QRDBs are arranged in series such that an output of a previous QRDB is an input of a next QRDB.

13. The electronic device of claim 8, wherein each QRDB further comprises a quaternion gated deconvolutional feed forward network (QGDFN) configured to suppress one or more of the multiple deep features.

14. The electronic device of claim 8, wherein, to reconstruct the multiple deep features into the high-resolution image, the at least one processing device is configured to:
   process the multiple deep features using a second quaternion convolutional network;
   perform a pixel shuffle on an output of the second quaternion convolutional network; and
   process an output of the pixel shuffle using a third quaternion convolutional network to generate the high-resolution image.

15. A non-transitory machine-readable medium containing instructions that when executed cause at least one processor of an electronic device to:
   extract multiple shallow features from a low-resolution image using a shallow feature extractor that includes a quaternion convolutional network;
   extract multiple deep features from the multiple shallow features using a deep feature extractor that includes multiple quaternion residual distillation blocks (QRDBs), each QRDB comprising a quaternion self-attention module; and
   reconstruct the multiple deep features into a high-resolution image.

16. The non-transitory machine-readable medium of claim 15, wherein the instructions that when executed cause the at least one processor to extract the multiple shallow features from the low-resolution image comprise:
   instructions that when executed cause the at least one processor to:
      extract red, green, blue, and grayscale channels from the low-resolution image; and
      process the red, green, blue, and grayscale channels using the quaternion convolutional network to generate multiple feature vectors representing the multiple shallow features.

17. The non-transitory machine-readable medium of claim 15, wherein the quaternion convolutional network comprises a leaky rectified linear unit (ReLU).

18. The non-transitory machine-readable medium of claim 15, wherein the QRDBs are arranged in series such that an output of a previous QRDB is an input of a next QRDB.

19. The non-transitory machine-readable medium of claim 15, wherein each QRDB further comprises a quaternion gated deconvolutional feed forward network (QGDFN) configured to suppress one or more of the multiple deep features.

20. The non-transitory machine-readable medium of claim 15, wherein the instructions that when executed cause the at least one processor to reconstruct the multiple deep features into the high-resolution image comprise:
   instructions that when executed cause the at least one processor to:
      process the multiple deep features using a second quaternion convolutional network;
      perform a pixel shuffle on an output of the second quaternion convolutional network; and
      process an output of the pixel shuffle using a third quaternion convolutional network to generate the high-resolution image.

* * * * *